(12) United States Patent
Ickin

(10) Patent No.: US 11,451,879 B2
(45) Date of Patent: Sep. 20, 2022

(54) CONTROLLING PLAYOUT OF ADVERTISEMENT CONTENT DURING VIDEO-ON-DEMAND VIDEO STREAMING ON AN END-USER TERMINAL

(71) Applicant: Telefonaktiebolaget LM Ericsson (publ), Stockholm (SE)

(72) Inventor: Selim Ickin, Stocksund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/770,650

(22) PCT Filed: Dec. 13, 2017

(86) PCT No.: PCT/EP2017/082694
§ 371 (c)(1),
(2) Date: Jun. 8, 2020

(87) PCT Pub. No.: WO2019/114956
PCT Pub. Date: Jun. 20, 2019

(65) Prior Publication Data
US 2020/0304885 A1 Sep. 24, 2020

(51) Int. Cl.
*H04N 21/234* (2011.01)
*H04N 21/236* (2011.01)
(Continued)

(52) U.S. Cl.
CPC ..... *H04N 21/812* (2013.01); *H04N 21/44209* (2013.01); *H04N 21/458* (2013.01); *H04N 21/47202* (2013.01)

(58) Field of Classification Search
None
See application file for complete search history.

(56) References Cited

U.S. PATENT DOCUMENTS

2008/0271069 A1   10/2008   Kim et al.
2010/0107191 A1   4/2010    Feng et al.
(Continued)

FOREIGN PATENT DOCUMENTS

WO   2007037568 A1   4/2007
WO   2009020640 A2   2/2009
(Continued)

OTHER PUBLICATIONS

Hoßfeld, T. et al., "Quantification of YouTube QoE via Crowdsourcing", 2011 IEEE International Symposium on Multimedia, Dec. 5, 2011, pp. 494-499, IEEE.

*Primary Examiner* — Brian T Pendleton
*Assistant Examiner* — Jean D Saint Cyr
(74) *Attorney, Agent, or Firm* — Coats & Bennett, PLLC

(57) ABSTRACT

A method (100) of controlling playout of advertisement content during video-on-demand video streaming on an end-user client terminal comprising steps of: receiving (110) advertisement content from an advertisement server; receiving (112) video-on-demand, VoD, content from a content delivery network; obtaining (114) network quality metrics between the end-user terminal and the content delivery network; predicting (116) whether a stalling event will occur during playout of VoD content within a prediction time window based on the network quality metrics; and playing out (118) received VoD content and received advertisement content, wherein playout of advertisement content within the prediction time window is dependent on a result of the prediction.

14 Claims, 10 Drawing Sheets

(51) Int. Cl.
  *H04N 21/238*    (2011.01)
  *H04N 21/24*     (2011.01)
  *H04N 21/442*    (2011.01)
  *H04N 21/647*    (2011.01)
  *H04N 21/81*     (2011.01)
  *H04N 21/458*    (2011.01)
  *H04N 21/472*    (2011.01)

(56) References Cited

U.S. PATENT DOCUMENTS

| | | | | |
|---|---|---|---|---|
| 2011/0083141 | A1* | 4/2011 | Westberg | H04N 21/418 |
| | | | | 725/31 |
| 2013/0054825 | A1* | 2/2013 | Mareachen | H04N 21/44004 |
| | | | | 709/231 |
| 2014/0359667 | A1* | 12/2014 | Kilar | H04N 21/812 |
| | | | | 725/37 |
| 2018/0332320 | A1* | 11/2018 | Barkley | H04N 21/23424 |
| 2019/0026772 | A1* | 1/2019 | Perakslis | H04L 65/4092 |

FOREIGN PATENT DOCUMENTS

| | | |
|---|---|---|
| WO | 2012114140 A1 | 8/2012 |
| WO | 2018086713 A1 | 5/2018 |

\* cited by examiner

CONTROLLING PLAYOUT OF ADVERTISEMENT CONTENT DURING VIDEO-ON-DEMAND VIDEO STREAMING ON AN END-USER TERMINAL

TECHNICAL FIELD

The invention relates to a method of controlling playout of advertisement content during video-on-demand video streaming on an end-user terminal. The invention further relates to an end-user terminal.

BACKGROUND

Playout of advertisements during video-on-demand, VoD, video streaming can be done in different ways, including just in time downloading or pre-fetching before the video stream starts. The placement and the location of the advertisements are typically defined by video service providers, manually. The video starts the play out and then the advertisements are typically downloaded and are injected to pre-defined locations of the video during video streaming. The choice of advertisement content and the location are done often based on algorithms to maximize the probability of the service provider targeting high hit rates of the advertisement content. The goal for the ad-insertion is to maximize the relevant advertisements presented to the end users to maximize profit. In parallel, ad-insertion needs to be done carefully such that it will not annoy the user in any way including the wrong content, wrong timing and wrong placement. Therefore, the procedure of advertisement placement is typically planned very carefully.

In VoD video streaming, the video content is not broadcast live, i.e. the content of the video can be watched anytime as the full content is stored in an external video server of a content delivery network, CDN. Example of VoD include series and movies offered by popular video service providers, such as HBO or Netflix. In VoD streaming, the content of which is generated earlier in time. The user can replay earlier video segments or parts of the video session at their own convenience, often by re-fetching those segments from the server.

The advertisement locations in time are known/set before the start of the video, and the location of the advertisement content is deterministic. Advertisement markers together with the corresponding advertisement content links are known by the video player, and when the time to play the advertisement comes, the advertisement content is played/displayed at these predefined locations during a video stream. When there is an advertisement insertion, the original content can be delayed rather than replacing original video segments with advertisement content, and the original video content can be played out later in time, i.e., after the advertisement playout.

A typical ad-insertion procedure is as follows: a video player is created and information regarding the chosen video content is fetched to the video player, including advertisement source links and information on when each advertisement content should be displayed; a manifest file is created containing the available bitrates of the video server and the link to the available CDN's; video segments are downloaded from the CDN to the playback buffer of the video player and then video playback starts; and the video player plays out the video content and, when an advertisement marker is reached, the advertisement content is downloaded, using a link for the advertisement provided to the video player along with the video source information in the manifest file, and then played out by the video player.

Video services, especially when they are connected to a shared mobile network, can experience various quality degradations during playout, such as low bitrate and temporal impairments such as stalling events. This is often caused by low throughput in the link between an access point of the mobile network and the end-user terminal, causing the playback buffer of the video player to underflow. Rebuffering events, including stalling events, (also known as freezes) are one for the most critical artifacts that negatively impact the perceived Quality of Experience, QoE, for a user during VoD video streaming.

To ensure that there will be no rebuffering event during a video stream play out, depending on the throughput and the delay, the video player often selects the bitrate (if the original source exists in CDN as decoded with various and low bitrates) to match the throughput requirement of the video stream to prevent possible rebuffering or stalling events during a video stream. This is done by requesting a playout bitrate that is, at most, equal to the available network throughput. Stalling events can occur if fluctuation in the network throughput is high and when the video player is late in adapting the rate of incoming video data packets to the user-terminal terminal.

If advertisement content in video sessions is displayed sequentially with a stalling event, the impact of this on the QoE might increase. There might be cases where both a rebuffering event and advertisement playout occur during video content playout. A video streaming session in which this occurs also wastes energy due to the extended session duration of the VoD streaming.

In VoD, advertisement locations are often selected based only on the video content as the video content is generated long before it is watched by the end user, and this is often done without any consideration of the network quality during VoD video streaming.

Advertisement placement has been a challenge for service providers; they have to target both the right users with content relevant to the user, to be shown at the right time, and the advertisement are required to be watched and populated to as many users as possible. Both these requirements need to be met simultaneously, without impacting one another. If advertisement is not shown at the right time, during a video stream, the advertisement might not be as effective as it had been originally planned.

US20080271069 A1 describes a method of VoD video streaming comprising pre-caching of advertisement content and playout of advertisement content upon rebuffering.

SUMMARY

It is an object to provide an improved method of controlling playout of advertisement content during video-on-demand video streaming on an end-user terminal. It is a further object to provide an improved end-user terminal.

An aspect of the invention provides a method of controlling playout of advertisement content during video-on-demand video streaming on an end-user terminal. The method comprises steps of: receiving advertisement content from an advertisement server; receiving video-on-demand, VoD, content from a content delivery network; obtaining network quality metrics between the end-user terminal and the content delivery network; predicting whether a stalling event will occur during playout of VoD content within a prediction time window based on the network quality metrics; and playing out received VoD content and received advertisement content. Playout of advertisement content within the prediction time window is dependent on a result of the prediction.

Advantageously, advertisement content playout depends on whether or not a stalling event is predicted to occur within a certain time window, improving Quality of Experience, QoE, for a user. The method enables playout of advertisement content to be controlled in consideration of quality degradations in the content delivery network. The method may enable a rebuffering indicator to be replaced with advertisement content, which is expected to reduce user annoyance, and yield higher overall QoE. The method may advantageously prevent advertisement content playout and stalling events to occur sequentially during video content playout. The method may prevent too many consecutive advertisement play outs, giving the user a higher overall QoE. The method may save energy use at end-user terminals by preventing extended duration of video playout in case of stalling events, since advertisement content may replace stalling events.

In an embodiment, playout of advertisement content having a pre-set playout time that is later than a predicted stalling event within the prediction time window is brought forward so that the advertisement content is played out during the stalling event. This may reduce user annoyance, and yield higher overall QoE, since a frozen screen or a rebuffering indicator can be replaced with advertisement content. Advantageously, the method may prevent playout of advertisement content and stalling events to occur sequentially and consecutively. Time spent on advertisement content may be replaced with stalling events, and thus may minimize additional energy use and time spent on a VoD video stream by an end-user terminal as a result of stalling events, In an embodiment, playout of advertisement content having a pre-set playout time that is earlier than a predicted stalling event within the prediction time window is delayed so that the advertisement content is played out during the predicted stalling event. This may reduce user annoyance, and yield higher overall QoE, since a frozen screen or a rebuffering indicator can be replaced with advertisement content. Advantageously, the method may prevent playout of advertisement content and stalling events to occur sequentially and consecutively. Time spent on advertisement content may be replaced with stalling events, and thus may minimize additional energy use and time spent on a VoD video stream by an end-user terminal as a result of stalling events, In an embodiment, the method further comprises detecting a stalling event during playout of VoD content and bringing forward playout of advertisement content having a pre-set playout time that is later than the detected stalling event so that the advertisement content is played out during the detected stalling event. This may reduce user annoyance, and yield higher overall QoE, since a frozen screen or a rebuffering indicator can be replaced with advertisement content. Advantageously, the method may prevent playout of advertisement content and stalling events to occur sequentially and consecutively. Time spent on advertisement content may be replaced with stalling events, and thus may minimize additional energy use and time spent on a VoD video stream by an end-user terminal as a result of stalling events, In an embodiment, the method further comprises playing out advertisement content at a pre-set playout time if a result of the prediction is that no stalling event will occur within the prediction time window.

In an embodiment, the method comprises receiving a manifest file at a start of a VoD streaming session, the manifest file comprising at least one marker comprising an indication of a pre-set playout time for respective advertisement content. The method comprises playing out advertisement content when a respective marker is reached if a result of the prediction is that no stalling event will occur within the prediction time window.

In an embodiment, the VoD content has a video session duration. The method additionally comprises dividing the video session duration into a plurality of prediction time windows such that there is at most one pre-set playout time for advertisement content within each prediction time window. Advantageously, this may enable the location of advertisement content to be varied, in order to play out advertisement content during a stalling event, without moving the advertisement content too far from its original location. A user's QoE may therefore be improved without too much adverse impact on the advertiser.

In an embodiment, the video session duration is divided into a plurality of prediction time windows of equal duration such that there is at most one pre-set playout time for advertisement content within each prediction time window. Advantageously, this may enable the location of advertisement content to be varied, in order to play out advertisement content during a stalling event, without moving the advertisement content too far from its original location. A user's QoE may therefore be improved without too much adverse impact on the advertiser.

In an embodiment, playout of advertisement content is brought forward from a pre-set playout time in a current prediction time window or in the next prediction time window so that the advertisement content is played out during the stalling event within the current prediction time window. Advantageously, this may enable the location of advertisement content to be varied, in order to play out advertisement content during a stalling event, without moving the advertisement content too far from its original location. A user's QoE may therefore be improved without too much adverse impact on the advertiser.

In an embodiment, the step of predicting whether a stalling event will occur during playout of VoD content within a prediction time window is performed for a current prediction time window based on network quality metrics obtained during the preceding prediction time window. This may ensure a robust early prediction of video streaming quality during a steady state video playout.

In an embodiment, the step of predicting whether a stalling event will occur during playout of VoD content within a prediction time window is performed by a predictive machine learning algorithm.

In an embodiment, if a predicted stalling event or a detected stalling event has a duration of less than or equal to 3 s, the stalling event is ignored and playout of advertisement content is not varied from a pre-set playout time. This may ensure that advertisement content is only played out when a duration of a stalling event is estimated to negatively affect QoE; in the case of more than one stalling event, a stalling event duration of approximately 3 s causes a mean opinion score, MOS, of the VoD video streaming to drop below 3 (Fair).

In an embodiment, the step of obtaining network quality metrics of the content delivery network comprises continuously measuring network quality metrics. This may ensure a robust early prediction of video streaming quality during a steady state video playout.

In an embodiment, the network quality metrics comprise at least one of throughput within a preceding prediction time window and transmission delay between a video server of the content delivery network and the user terminal. Throughput is a bitrate of data coming from a video server to the end-user terminal. Delay is video server to end-user terminal transmission delay and can be a one-way or a round-trip delay.

In an embodiment, throughput comprises at least one of mean throughput, throughput standard deviation, and exponential moving weighted average.

In an embodiment, transmission delay comprises at least one of a mean transmission delay and a transmission delay standard deviation.

In an embodiment, the step of predicting whether a stalling event will occur during playout of VoD content within a prediction time window is additionally based on at least one of video playback buffer size and total playback time since start of video content playout.

In an embodiment, the end-user terminal comprises video player application software on a mobile device, such as a smartphone or a tablet.

In an embodiment, the step of receiving advertisement content from an advertisement server comprises pre-fetching the advertisement content from the advertisement server at the start of a video session, before fetching the video content from the content delivery network.

An aspect of the invention provides an end-user terminal comprising a processor and memory. Said memory contains instructions executable by said processor whereby said user terminal is operative to: receive advertisement content from an advertisement server; receive video-on-demand, VoD, content from a content delivery network; obtain network quality metrics between the end-user terminal and the content delivery network; predict whether a stalling event will occur during playout of VoD content within a prediction time window based on the network quality metrics; and play out received VoD content and received advertisement content. Playout of advertisement content within the prediction time window is dependent on a result of the prediction.

Advantageously, advertisement content playout depends on whether or not a stalling event is predicted to occur within a certain time window, improving Quality of Experience, QoE, for a user. The end-user terminal enables playout of advertisement content to be controlled in consideration of quality degradations in the content delivery network. The end-user terminal may enable a rebuffering indicator to be replaced with advertisement content, which is expected to reduce user annoyance, and yield higher overall QoE. The end-user terminal may advantageously prevent advertisement content playout and stalling events to occur sequentially during video content playout. The end-user terminal may prevent too many consecutive advertisement play outs, giving the user a higher overall QoE. The end-user terminal may save energy use by preventing extended duration of video playout in case of stalling events, since advertisement content may replace stalling events.

In an embodiment, said memory contains instructions executable by said processor whereby said user terminal is operative to bring forward playout of advertisement content having a pre-set playout time that is later than a predicted stalling event within the prediction time window so that the advertisement content is played out during the stalling event. This may reduce user annoyance, and yield higher overall QoE, since a frozen screen or a rebuffering indicator can be replaced with advertisement content. Advantageously, the end-user terminal is configured to prevent playout of advertisement content and stalling events occurring sequentially and consecutively. Time spent on advertisement content may be replaced with stalling events, and thus may minimize additional energy use and time spent on a VoD video stream by the end-user terminal as a result of stalling events, In an embodiment, said memory contains instructions executable by said processor whereby said user terminal is operative to delay playout of advertisement content having a pre-set playout time that is earlier than a predicted stalling event within the prediction time window so that the advertisement content is played out during the predicted stalling event. This may reduce user annoyance, and yield higher overall QoE, since a frozen screen or a rebuffering indicator can be replaced with advertisement content. Advantageously, the end-user terminal is configured to prevent playout of advertisement content and stalling events occurring sequentially and consecutively. Time spent on advertisement content may be replaced with stalling events, and thus may minimize additional energy use and time spent on a VoD video stream by the end-user terminal as a result of stalling events, In an embodiment, said memory contains instructions executable by said processor whereby said user terminal is operative to detect a stalling event during VoD content playout and is operative to bring forward playout of advertisement content having a pre-set playout time that is later than a detected stalling event so that the advertisement content is played out during the detected stalling event. This may reduce user annoyance, and yield higher overall QoE, since a frozen screen or a rebuffering indicator can be replaced with advertisement content. Advantageously, the end-user terminal is configured to prevent playout of advertisement content and stalling events occurring sequentially and consecutively. Time spent on advertisement content may be replaced with stalling events, and thus may minimize additional energy use and time spent on a VoD video stream by the end-user terminal as a result of stalling events, In an embodiment, said memory contains instructions executable by said processor whereby said user terminal is operative to play out advertisement content at a pre-set playout time if a result of the prediction is that no stalling event will occur within the prediction time window.

In an embodiment, the VoD content has a video session duration. Said memory contains instructions executable by said processor whereby said user terminal is operative to divide the video session duration into a plurality of prediction time windows such that there is at most one pre-set playout time for advertisement content within each prediction time window. Advantageously, this may enable the location of advertisement content to be varied, in order to play out advertisement content during a stalling event, without moving the advertisement content too far from its original location. A user's QoE may therefore be improved without too much adverse impact on the advertiser.

In an embodiment, said memory contains instructions executable by said processor whereby said user terminal is operative to divide the video session duration into a plurality of prediction time windows of equal duration such that there is at most one pre-set playout time for advertisement content within each prediction time window. Advantageously, this may enable the location of advertisement content to be varied, in order to play out advertisement content during a stalling event, without moving the advertisement content too far from its original location. A user's QoE may therefore be improved without too much adverse impact on the advertiser.

In an embodiment, said memory contains instructions executable by said processor whereby said user terminal is operative to bring forward playout of advertisement content from a pre-set playout time in a current prediction time window or in the next prediction time window so that the advertisement content is played out during the stalling event within the current prediction time window. Advantageously, this may enable the location of advertisement content to be varied, in order to play out advertisement content during a stalling event, without moving the advertisement content too far from its original location. A user's QoE may therefore be improved without too much adverse impact on the advertiser.

In an embodiment, said memory contains instructions executable by said processor whereby said user terminal is operative to predict whether a stalling event will occur during playout of VoD content during a current prediction time window based on network quality metrics obtained during the preceding prediction time window. This may ensure a robust early prediction of video streaming quality during a steady state video playout.

In an embodiment, said memory contains instructions executable by said processor whereby said user terminal is operative to predict whether a stalling event will occur during playout of VoD content within a prediction time window by a predictive machine learning algorithm.

In an embodiment, said memory contains instructions executable by said processor whereby said user terminal is operative to ignore a predicted stalling event or a detected stalling event that has a duration of less than or equal to 3 s, such that playout of advertisement content is not varied from a pre-set playout time. This may ensure that advertisement content is only played out when a duration of a stalling event is estimated to negatively affect QoE; in the case of more than one stalling event, a stalling event duration of approximately 3 s causes a mean opinion score, MOS, of the VoD video streaming to drop below 3 (Fair).

An aspect of the invention provides a computer program, comprising instructions which, when executed on at least one processor, cause the at least one processor to carry out any of the above steps of the method of controlling playout of advertisement content during video-on-demand video streaming on an end-user terminal.

An aspect of the invention provides a data carrier having computer readable instructions embodied therein. The said computer readable instructions are for providing access to resources available on a processor. The computer readable instructions comprise instructions to cause the processor to perform any of the above steps of the method of controlling playout of advertisement content during video-on-demand video streaming on an end-user terminal.

In an embodiment, the data carrier is a non-transitory data carrier.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Embodiments of the invention will now be described, by way of example only, with reference to the accompanying drawings.

DETAILED DESCRIPTION

The same reference numbers will used for corresponding features in different embodiments.

Figure 1:
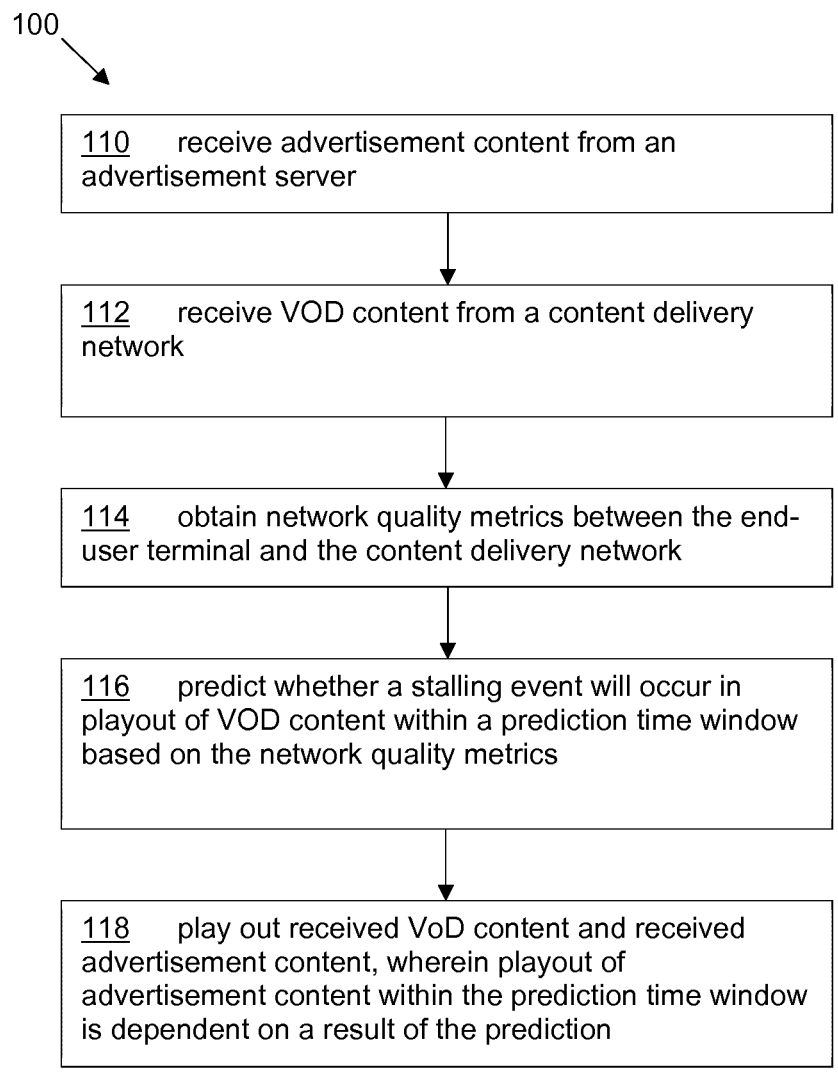
FIGS. 1 to 11 illustrate methods of controlling playout of advertisement content during video-on-demand, VoD, video streaming on an end-user terminal according to embodiments of the invention.

Referring to FIG. 1, an embodiment of the invention provides a method 100 of controlling playout of advertisement content during VoD video streaming on an end-user terminal. The method comprises steps of:

receiving 110 advertisement content from an advertisement server;

receiving 112, VoD content from a content delivery network;

obtaining 114 network quality metrics between the end-user terminal and the content delivery network, CDN;

predicting 116 whether a stalling event will occur during playout of VoD content within a prediction time window based on the network quality metrics; and playing out 118 received VoD content and received advertisement content. Playout of advertisement content within the prediction time window is dependent on a result of the prediction.

The network quality metrics are end-to-end network quality metrics between the end-user terminal and the CDN.

Stalling events include rebuffering events (due to playback buffer starvation) that cause visual freezes. In situations where there is a high fluctuation in network throughput, the adaptation of the end-user terminal to variations in network throughput might be slow and may not be fast enough to prevent stalling events. There can also be some cases where the minimum available video playback rate, i.e. video consumption bitrate, becomes higher than the available throughput and this causes starvation (underflow) of a playback buffer of the end-user terminal, causing rebuffering events. As this depends on the content delivery network, it cannot be prevented by the end-user terminal. By enabling a rebuffering event to be predicted based on measurements of network quality metrics during active traffic, a stalling event can be replaced with advertisement content that is in any case planned to be shown to the user later in time. This way, time spent on advertisement content will be replaced with stalling events, and will minimize the use of extra energy and time spent on the VoD video stream during stalling events.

In an embodiment, the end-user terminal is a video player on a mobile device, such as a smartphone or a tablet.

In an embodiment, the step of receiving 110 advertisement content from an advertisement server comprises pre-fetching the advertisement content from the advertisement server at the beginning of a VoD video stream.

Pre-fetching advertisement content at the beginning of VoD video streaming is preferred to just-in-time, JIT, downloading of advertisement content since JIT advertisement content downloading should not be done in a state where a video player on an end-user terminal is already in a state of rebuffering of original video content. Since advertisement content is often not long, pre-fetching is not expected to impact network requirements significantly.

Figure 2:
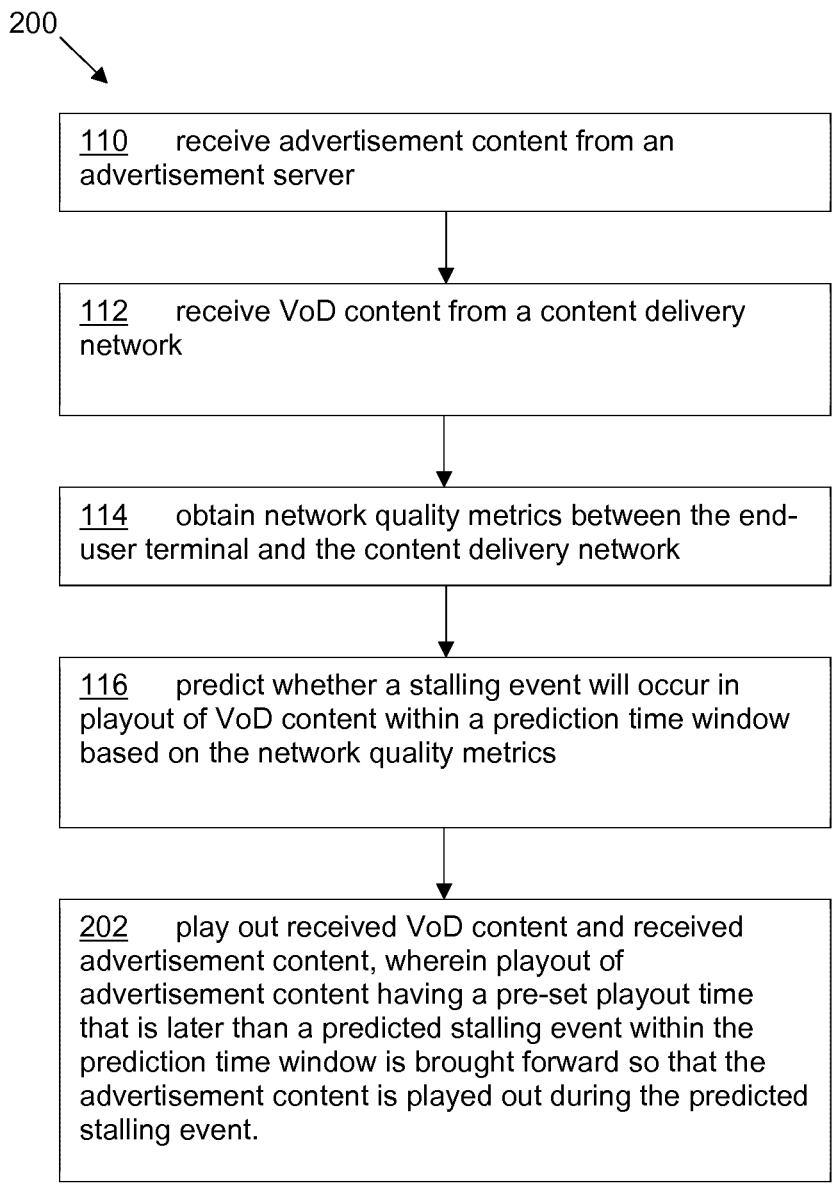

Referring to FIG. 2, an embodiment of the invention provides a method 200 of controlling playout of advertisement content during VoD video streaming on an end-user terminal. In this embodiment, playout of advertisement content having a pre-set playout time that is later than a predicted stalling event within the prediction time window is brought forward 202 so that the advertisement content is played out during the stalling event.

Figure 3:
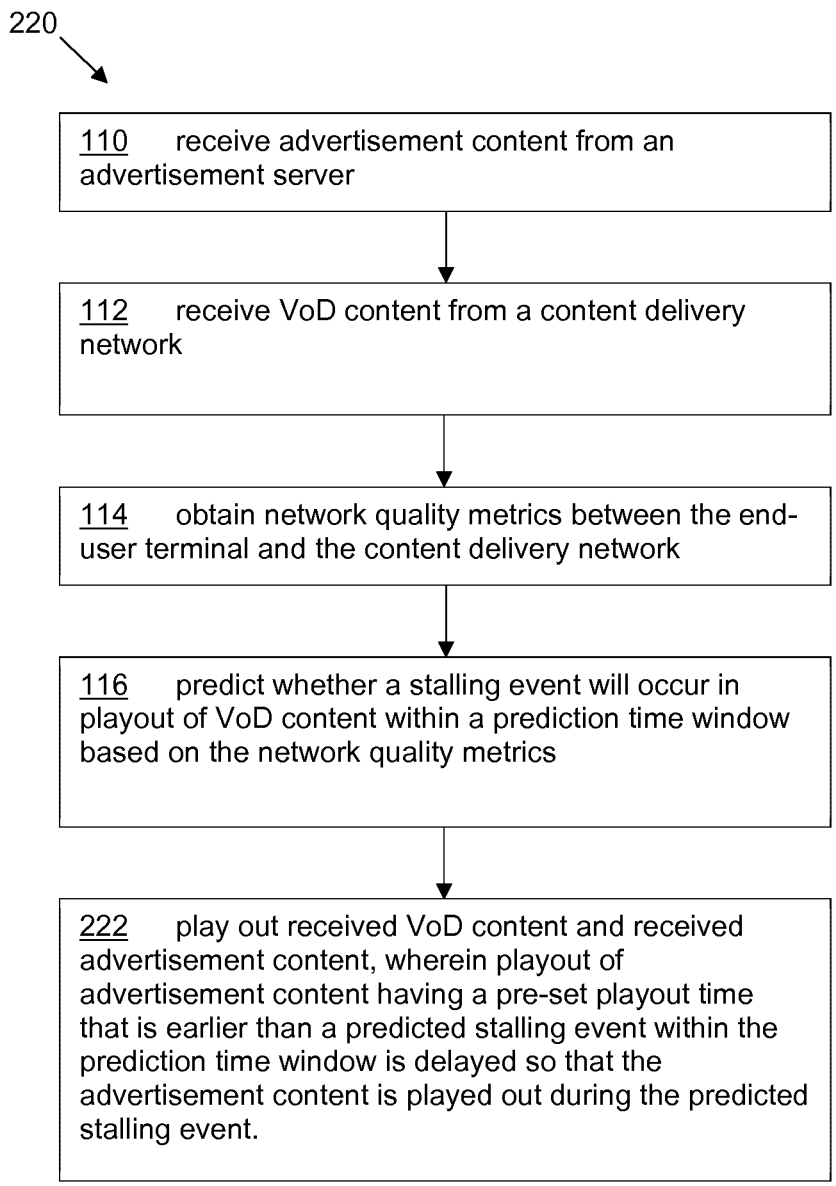

Referring to FIG. 3, an embodiment of the invention provides a method 220 of controlling playout of advertisement content during VoD video streaming on an end-user terminal. In this embodiment, playout of advertisement content having a pre-set playout time that is earlier than a predicted stalling event within the prediction time window is delayed 222 so that the advertisement content is played out during the predicted stalling event.

Figure 4:
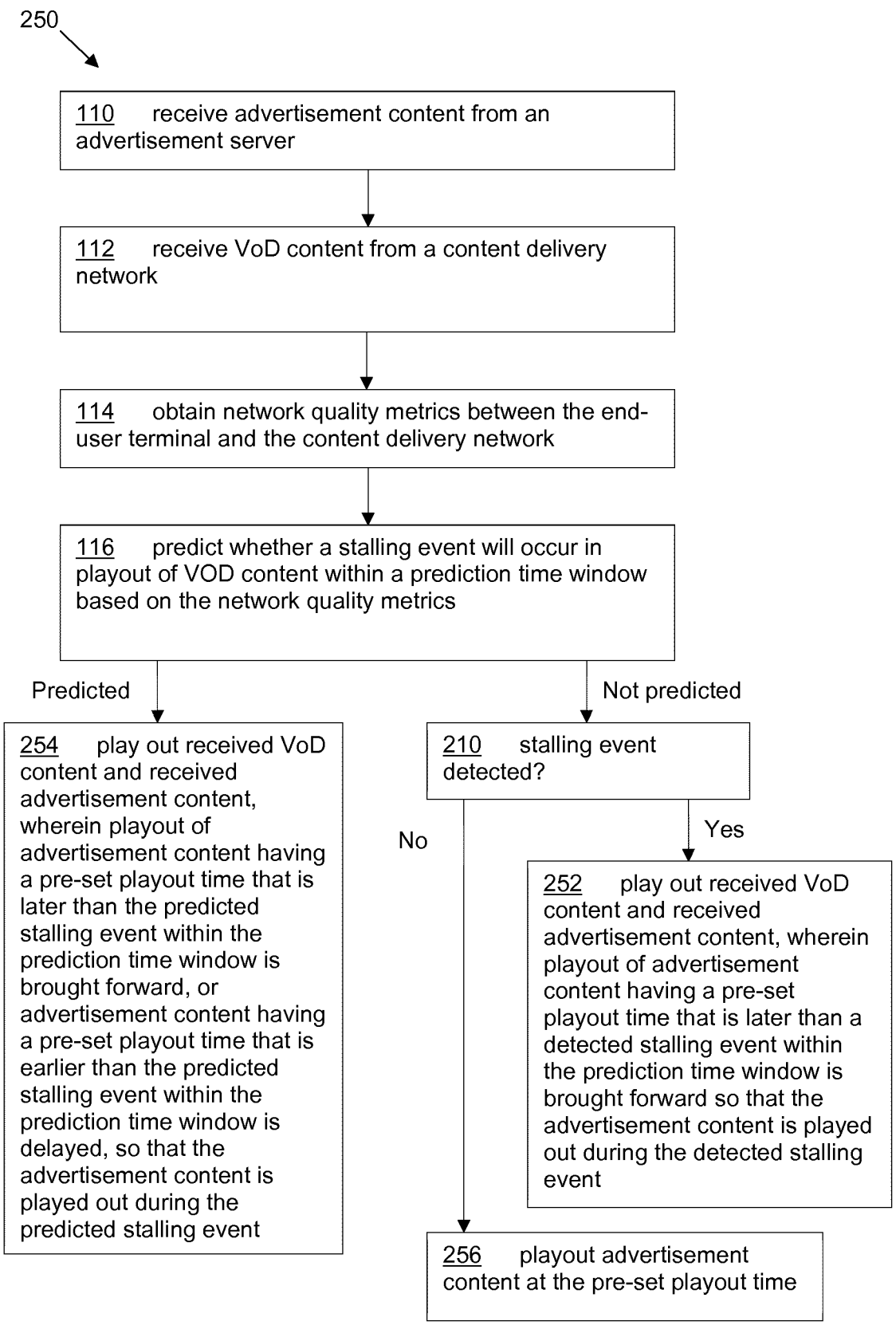

Referring to FIG. 4, an embodiment of the invention provides a method 250 of controlling playout of advertisement content during VoD video streaming on an end-user terminal. In this embodiment, if a stalling event is predicted to occur within a prediction time window, playout 254 of advertisement content is brought forward if the advertisement content has a pre-set playout time that is later than the predicted stalling event and playout of advertisement content is delayed if the advertisement content has a pre-set playout time that is earlier than the predicted stalling event.

The method 250 also comprises detecting 210 a stalling event during playout of VoD content, and bringing forward 252 playout of advertisement content having a pre-set playout time that is later than the detected stalling event so that the advertisement content is played out during the detected stalling event. In this embodiment, a stalling event may be detected 210 if no stalling event is predicted.

If no stalling event is predicted 116 and no stalling event is detected during playout of video content within a prediction time window, any advertisement content having a pre-set playout time within the prediction time window will be played out 256 at its pre-set playout time.

In the methods illustrated in FIGS. 2 to 4, the location of advertisement content can be fine-tuned during VoD video streaming based on network quality metrics that can be measured at the end-user terminal. If the original playout time of advertisement content comes before a stalling event (in the case that a rebuffering is predicted at the beginning of a prediction time window), advertisement content playout is postponed so that it is played out during the predicted stalling event. If a stalling event occurs before the pre-set playout time of advertisement content, playout of the advertisement content is brought forward so that it occurs during the stalling event, i.e. earlier than advertisement's pre-set playout time. If a stalling event is predicted within a prediction time window, the advertisement location may be fine-tuned and displayed during the stalling event. In other words, the method replaces a stalling event (often represented as a spinning wheel) with advertisement content while informing the user about the replacement and the underlying reason behind. An algorithm may be used to periodically predict, based on the network quality metrics as input to the algorithm, whether a stalling event will occur.

The method enables advertisement content in VoD video streams to replace (synchronize with) stalling events and enables the advertisement content to be placed in consideration of quality degradations in the network. This may prevent advertisement content and stalling events to exist in a sequential manner during VoD video content playout. Thus, the method may increase user perceived QoE, and reduce energy consumption on the end-user terminal and the time spent on the video stream by the user.

Fine-tuning of the advertisement content location may be done in one three ways, depending on the result of the prediction:

Delaying the advertisement content if a stalling event is predicted within a given prediction time window (as illustrated in FIG. 3);

Early display of the advertisement content from its originally planned location if a stalling event is predicted or detected within a given prediction time window (as illustrated in FIGS. 2 and 4); and On time display of the advertisement content as originally planned, if no stalling event is predicted or detected (as illustrated in FIG. 4).

Figure 5:
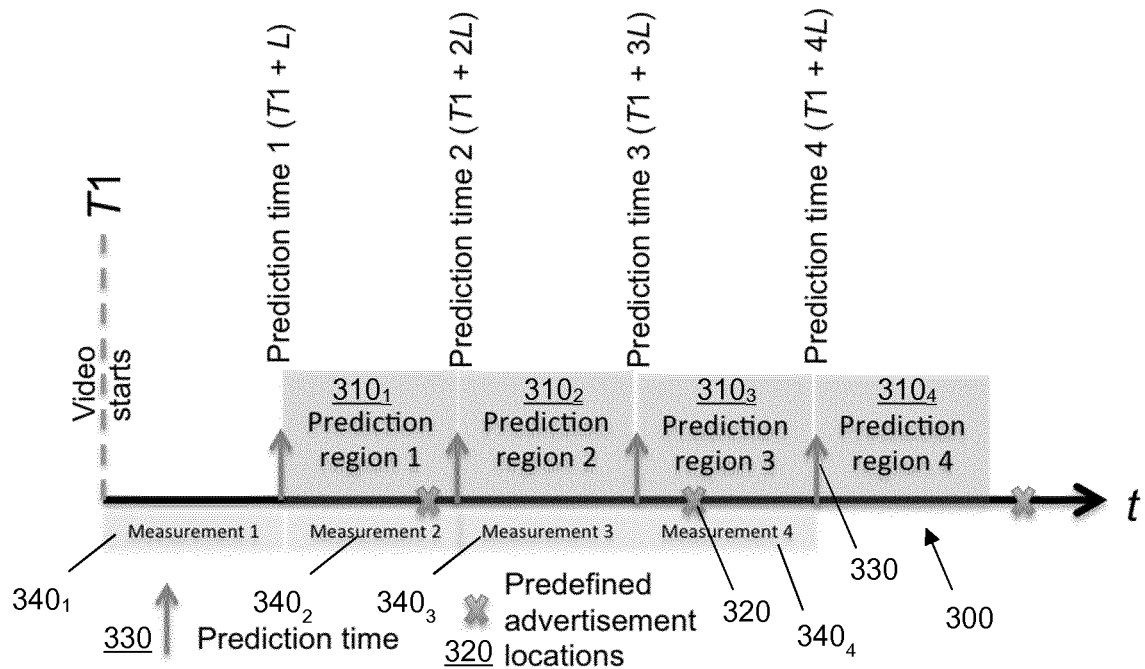

Referring to FIG. 5, an embodiment of the invention provides a method of controlling playout of advertisement content during VoD video streaming on an end-user terminal in which the VoD content has a video session duration 300 and the method additionally comprising dividing the video session duration into a plurality of prediction time windows 310 such that there is at most one pre-set playout time 320 for advertisement content within each prediction time window.

In an embodiment, playout of advertisement content is brought forward from a pre-set playout time 320 in a current prediction time window $310_n$ or in the next prediction time window $310_{n+1}$ so that the advertisement content is played out during a stalling event predicted to occur within the current prediction time window.

Referring to FIG. 5, if a stalling event is predicted to occur in prediction time window $310_1$ at a time earlier than the pre-set playout time for advertisement content 320 within that time window, playout of the advertisement content is brought forward within prediction time window $310_1$. If a stalling event is predicted to occur in prediction time window $310_2$ which does not contain a pre-set playout time for advertisement content 320, playout of advertisement content 320 is brought forward from the next prediction time window $310_3$.

The step of predicting is performed for the prediction time window $310_n$ based on network quality metrics $340_n$ obtained during the preceding prediction time window $310_{n-1}$.

Therefore, in order to overlap a stalling event with advertisement content playout, the location of the advertisement content is varied from its original location, but without significantly moving it from its original location. To maximize a user's QoE necessitates robust early prediction of video content quality during steady state video content playout.

In an embodiment, the video session duration is divided into equal length prediction time windows; two-minute long windows are used here. An algorithm is then employed to predict whether there will be a stalling event within prediction time window n, having length L seconds, i.e. whether a stalling event will occur within the next L seconds. Each prediction is done based on active measurements of network quality metrics performed up to the prediction time, at measurement region $340_n$, since the last prediction time, as illustrated in FIG. 5; the prediction time window of Prediction$_n$, is the measurement region of Prediction$_{n+1}$.

Figure 6:
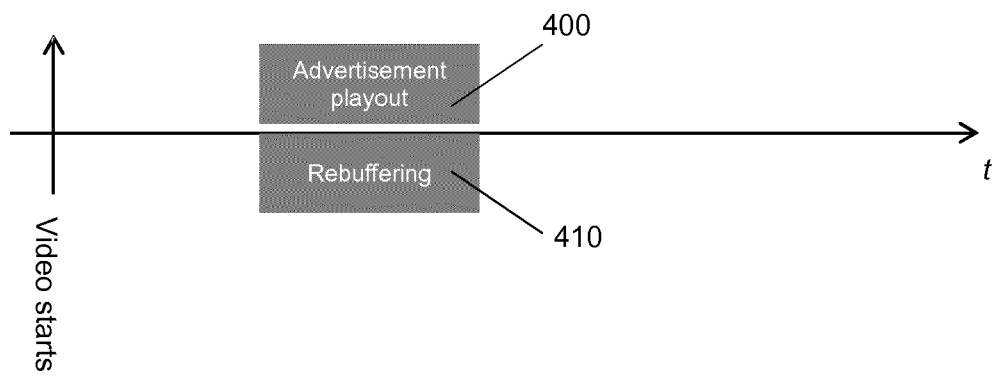

Depending on the location of the advertisement content 320 and a predicted stalling event, the location of the advertisement content can be changed slightly to maximize user QoE, while not varying the original location of the advertisement content. This means that when a stalling event occurs, the advertisement content, which in this example is originally located later in time and nearby, is displayed a bit earlier, during the stalling event duration. Ideally, playout of advertisement content 400 is synchronized with a stalling ('rebuffering' due to playback buffer starvation) event 410, as illustrated in FIG. 6. If the original location of the advertisement content comes before a stalling event (given that a stalling event is predicted at the beginning of the prediction time window), playout of the advertisement content is postponed and is played out later during the predicted stalling event, but without significant delay from its original location.

In an embodiment, if a predicted stalling event has a duration of less than or equal to 3 s, the stalling event is ignored and playout of advertisement content is not varied from a pre-set playout time. Similarly, if a stalling event is detected during video content playout, it is ignored if it has a duration of less than or equal to 3 s.

In an embodiment, the step of predicting 116 whether a stalling event will occur is performed using a predictive machine-learning model use the following metrics as input as a result of active measurements prior to the video stream: network quality (throughput and delay) and application metrics (e.g. video playback buffer size). The model is trained with various scenarios before real life deployment. The measurements are not only done at the start of receiving a video stream of VoD content, but also are done in a periodic manner throughout the video stream.

A prediction of rebuffering applies if a predicted stalling event has a duration of longer than 3 s; otherwise the prediction is ignored and is considered to be a "no stalling prediction". A stalling event is only detected if it lasts more than 3 s, otherwise no stalling is detected.

The motivation for a 3 s stalling event duration cut-off is that in the case of more than 1 stalling event, approximately 3 s long stalling causes a mean opinion score, MOS, (a QoE measure) to drop below 3 (Fair); where 5 is Excellent, 4 is Good, 3 is Fair, 2 is Poor, and 1 is Bad. In other words, advertisement content is played out during a stalling event when the duration of the stalling event is estimated to negatively impact QoE.

The predictive machine-learning model is trained (supervised) with streaming video content and the result whether a rebuffering occurred or not after a given set of network quality metrics (measured during video streaming during each of the prediction time windows). It is a binary classification model. When enough measurement data has been collected, the machine-learning model is trained with the following input and output label with supervised learning algorithms.

A machine-learning algorithm is selected for the predictive machine-learning model depending on the complexity/size of the video content data. Suitable algorithms include Deep Neural Network, Support Vector Machines, SVM, Random Forest, and Extreme Gradient Boosting, XGBoost.

The network quality metric set for the machine-learning algorithm includes the following:

Exponential Weighted Moving Average, EWMA, 510 of the throughput computed at the time of the prediction, calculated as follows:

$$\alpha * (V_{T1+nL}) + (1-\alpha) * \text{EWMA}(V_{T1+(n-1)L})$$

where $\alpha$ is chosen as 0.25 to cover historical throughput within the last 4 time windows, i.e., 4 L long duration;

Total playback time (in seconds) 512 since the start of the VoD video stream until the prediction time;

Mean 516 and standard 514 deviation of the throughput as measured since the last prediction time (i.e., within the last prediction region); and Mean 518 and the standard deviation 520 of the delay as measured since the last prediction time (i.e., within the last prediction region).

Each prediction time window 310 is labelled 522 based on a measured stalling event duration within the prediction time window. If the stalling event duration is less than or equal to 3 s, a label of '0' is applied, otherwise a label of '1' is applied.

TABLE 1

| | | | 514 | | | 520 | |
| | | | Standard | | 518 | Standard | |
| | | 512 | deviation | 516 | Mean | deviation | Measured |
| | 510 | Total | of | Mean | active | active | stalling |
| | EWMA of | playback | throughput | throughput | delay | delay | duration |
| 330 | throughput | time until | (measured | (measured | (measured | (measured | occurred |
| Prediction | since the | the | within last | within last | within last | within last | at $(T_n + L)$ |
| time | start of the | prediction | L | L | L | L | 522 |
| (ms) | video | (s) | seconds) | seconds) | seconds) | seconds) | [label] |
| $T_1 + L$ | 5.25 Mbit/s | 10 | 500 Kbit/s | 3 Mbit/s | 100 ms | 200 ms | 10 s [1] |
| $T_1 + 2L$ | 4.44 Mbit/s | 20 | 900 Kbit/s | 2 Mbit/s | 50 ms | 20 ms | 5 s [1] |
| $T_1 + 3L$ | 4.58 Mbit/s | 30 | 50 Kbit/s | 5 Mbit/s | 40 ms | 5 ms | 2 s [0] |
| $T_1 + NL$ | $\alpha * (V_{T1+NL}) + (1-\alpha) * \text{EWMA}(V_{T1+(N-1)L})$ | 120 | 5 Kbit/s | $V_{T1+NL}$ | 5 ms | 2 ms | 0 s [0] |

Figure 7:
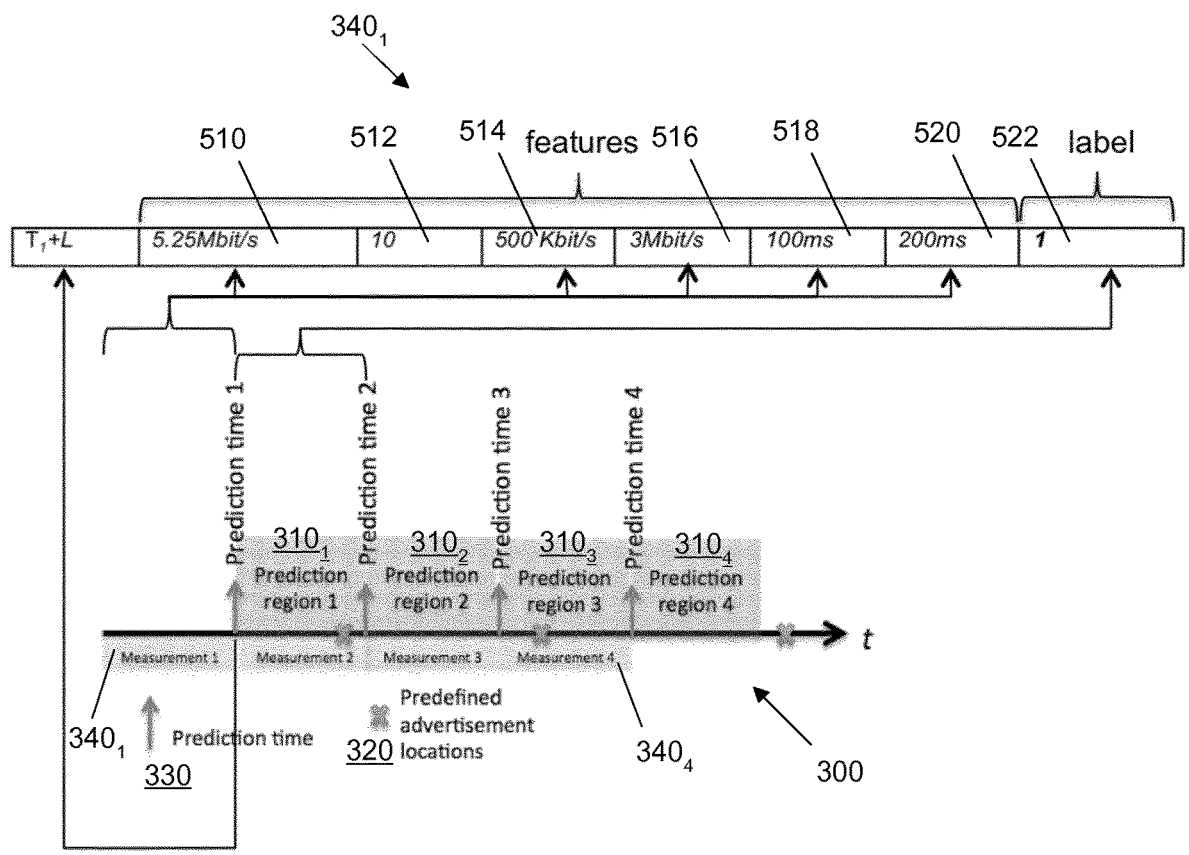

Machine-learning algorithm input network quality metric measurements and measured stalling event duration Each of the above rows in Table 1 is fed into the machine-learning algorithm as one instance at a time. The first row of the above table can be interpreted as illustrated in FIG. 7; $T_1+L$ is prediction time 1, and $T_1$ is the start of the video in FIG. 5.

After the machine-learning model has been trained, the model is verified with 10-folds cross validation. There are a few performance evaluation metrics for binary classification that can be used including the precision, the recall, the harmonic mean of precision and recall (f1 score), and ROC AUC.

Once the trained machine-learning model has been validated, it can be use for real world prediction. A measurement module in the end-user terminal measures network quality metrics between the end-user terminal and the CDN, as given above, during VoD video content streaming, and the machine-learning model predicts whether a stalling event will occur within a corresponding prediction time window.

Figure 8:
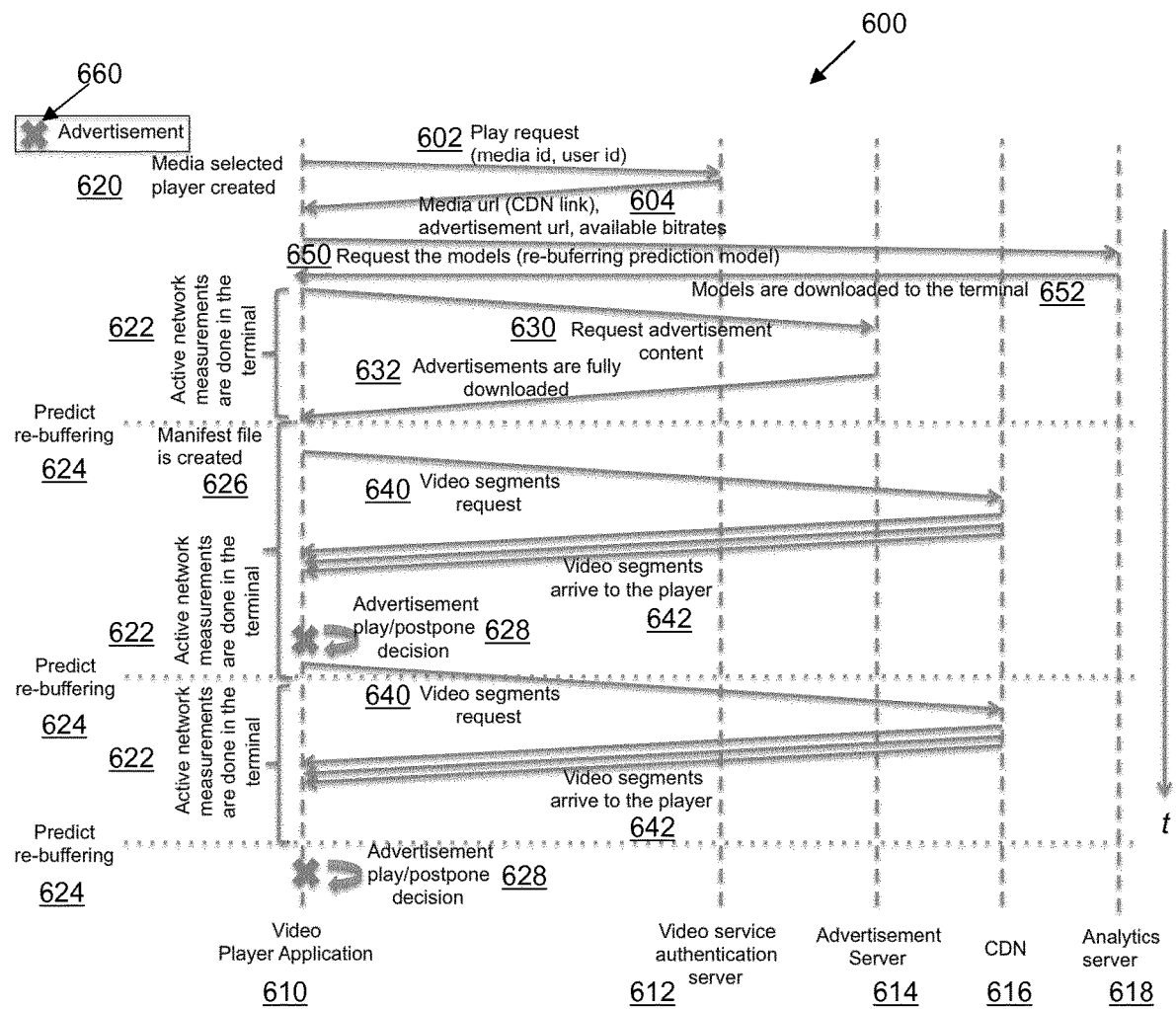

FIG. 8 illustrates signalling 600 between various nodes in a cloud server implementation of a method of controlling playout of advertisement content 632 during VoD video streaming on an end-user terminal.

The end-user terminal comprises a video player application 610.

The method comprises creating 620 a media selected player, i.e. the video player application 610 and sending a play request 602 to a video service authentication server 612, which sends back a media un (CDN link), advertisement content url, and available bitrates 604. The video player application then sends a request 650 to an analytics server for the machine-learning model for predicting whether a stalling event will occur. The machine-learning models are then downloaded 652 to the video player 610.

The video player sends a request 630 for advertisement content to an advertisement server 614, and advertisement content is downloaded 632 to the video player. A manifest file is created 626 containing the received advertisement content, including advertisement playout markers. Concurrently with receiving the advertisement content, the video player performs active network measurements 622 of the network quality metrics for the machine-learning algorithm and a stalling event prediction 624 is then performed.

The video player then sends a request 640 for video content to a content delivery network, CDN, 616, which are downloaded to 642 and received by the video player. Concurrently with receiving the video content, the video player performs active network measurements 622 of the network quality metrics for the machine-learning algorithm and a stalling event prediction 624 is then performed.

When an advertisement marker 660, indicating a pre-set playout time for advertisement content is reached, the video player decides whether to play the advertisement content associated with the marker (if no stalling event is predicted for the respective prediction time window and no stalling event has been detected in that prediction time window) or to postpone playout of the advertisement content (if a stalling event is predicted for a time later than the advertisement marker).

As noted previously, if the result of a stalling event prediction is that a stalling event will occur before the next advertisement marker, playout of the respective advertisement content is brought forward; this applies to an advertisement marker in the current or next prediction time window.

The process of requesting 640 video content, receiving video content 643, performing active network measurements 622 and predicting 624 whether a stalling event will occur is repeated for the duration of the VoD streaming session.

Figure 9:
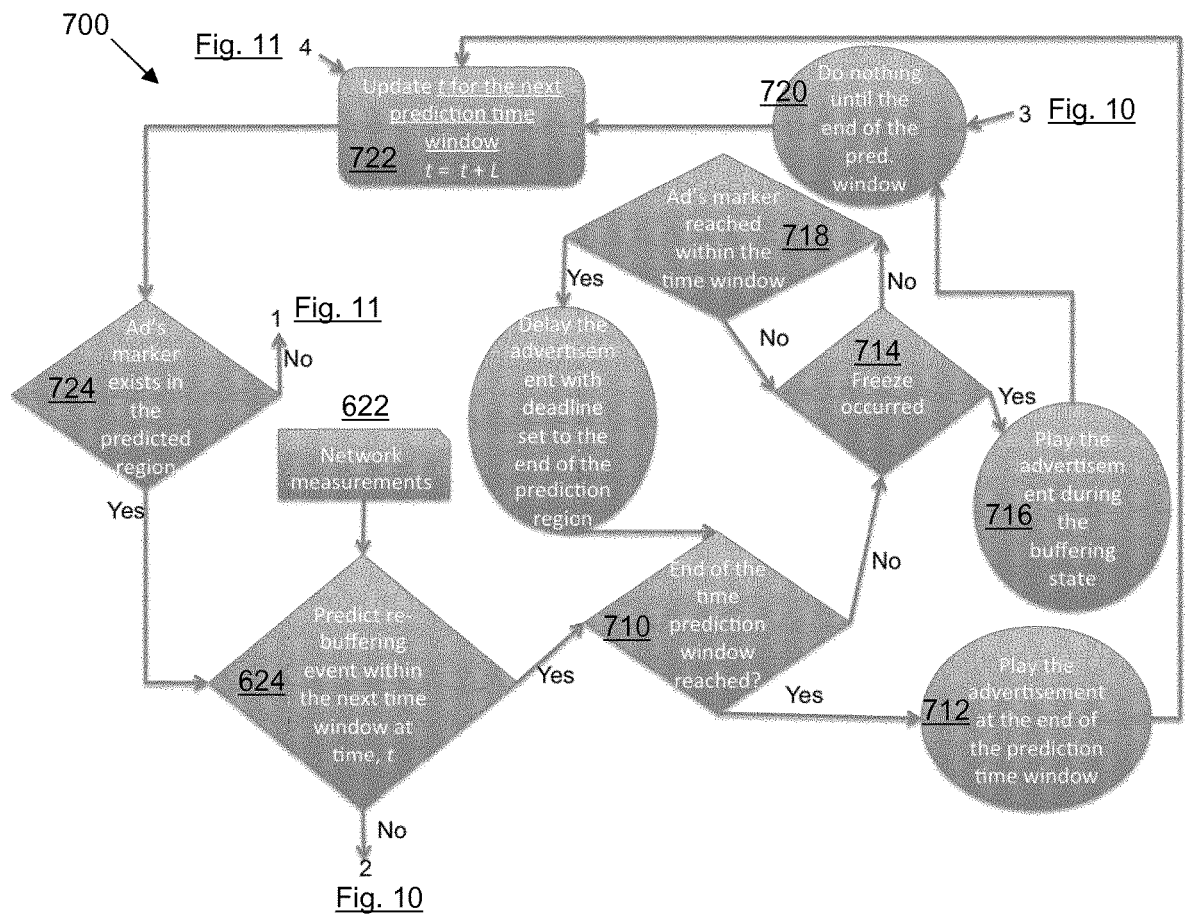
Figure 10:
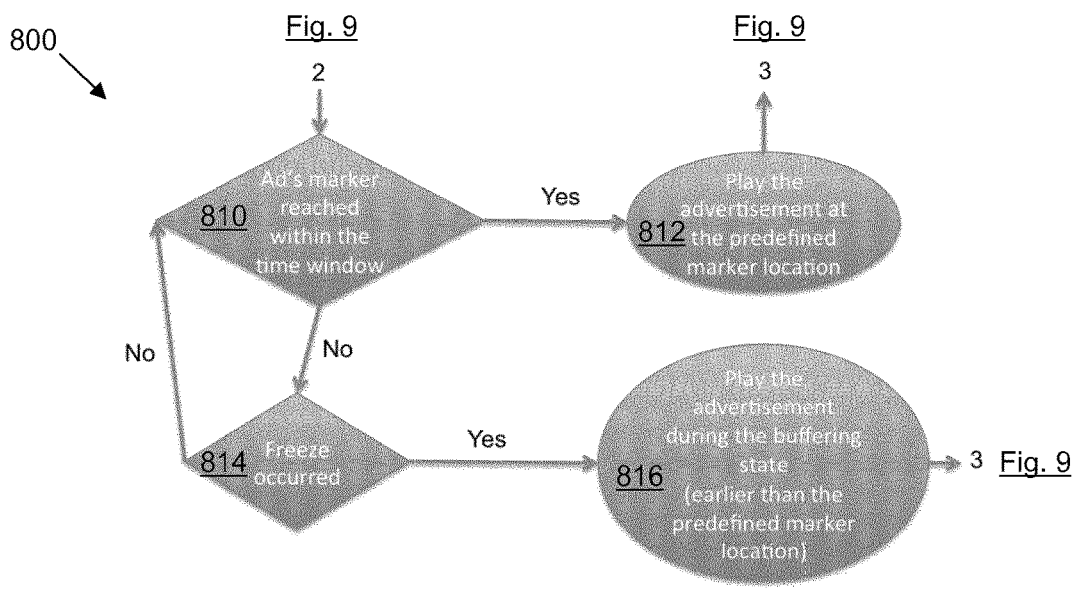
Figure 11:
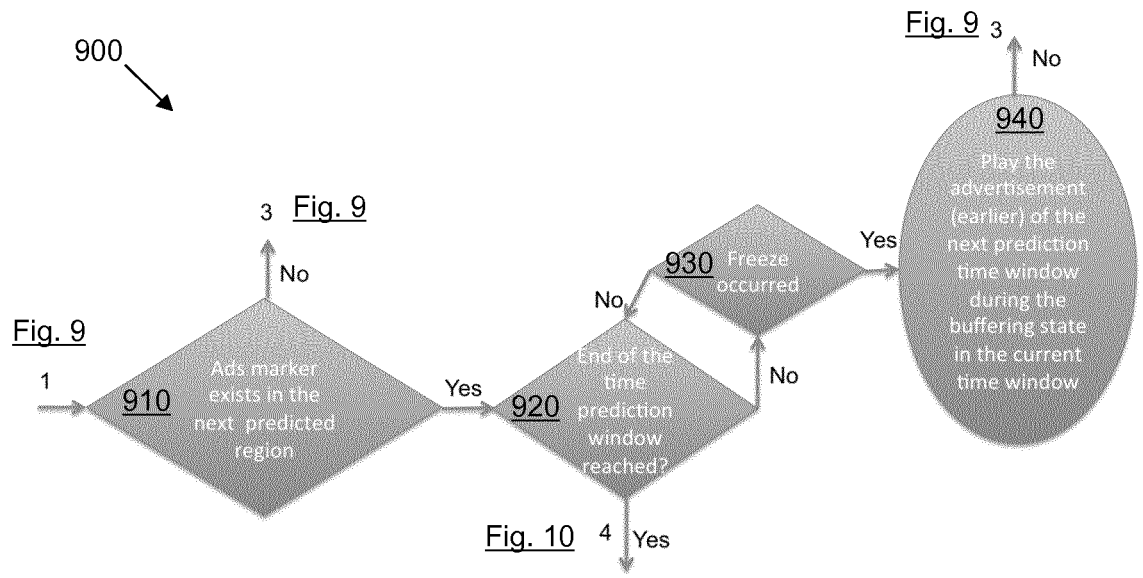

FIGS. 9 to 11 illustrate steps of a method of controlling playout of advertisement content during VoD video streaming on an end-user terminal according to an embodiment of the invention. The end-user terminal comprises a video player.

Before the VoD video stream starts, the video player divides the video session into equal (L seconds long) prediction time windows such that each prediction time window contains at most one advertisement marker.

FIG. 9 illustrates the overall method of this embodiment, showing details of how advertisement content playout is synchronized with stalling events, which in this example comprise rebuffering events. If there is an advertisement marker 724 located in a prediction time window, and a rebuffering event is predicted 624 during that prediction time window, if the pre-set playout time for the advertisement content is earlier than the predicted rebuffering event, playout of the advertisement content will be delayed so that it is played out 716 during the predicted rebuffering event ('buffering state'). If the prediction is wrong, the advertisement content will eventually be played at the end of the prediction time window 710, 712.

FIG. 10 illustrates what happens if an advertisement marker is reached 810 within the prediction time window, and no rebuffering is predicted. If the prediction is incorrect, and a stalling event ('freeze') is detected 814, the video player will playout the advertisement content earlier than its pre-set playout time 816. If no rebuffering event occurs before advertisement marker, then the advertisement content will be played out at its pre-set playout time 812.

FIG. 11 illustrates what happens if there is no advertisement content within the current prediction time window. There is no need to predict rebuffering, as there is no advertisement to postpone. If a rebuffering event occurs, the advertisement content in the next prediction time window is brought forward for playout within the current prediction time window.

Corresponding embodiments apply to the end-user terminals described below.

Figure 12:
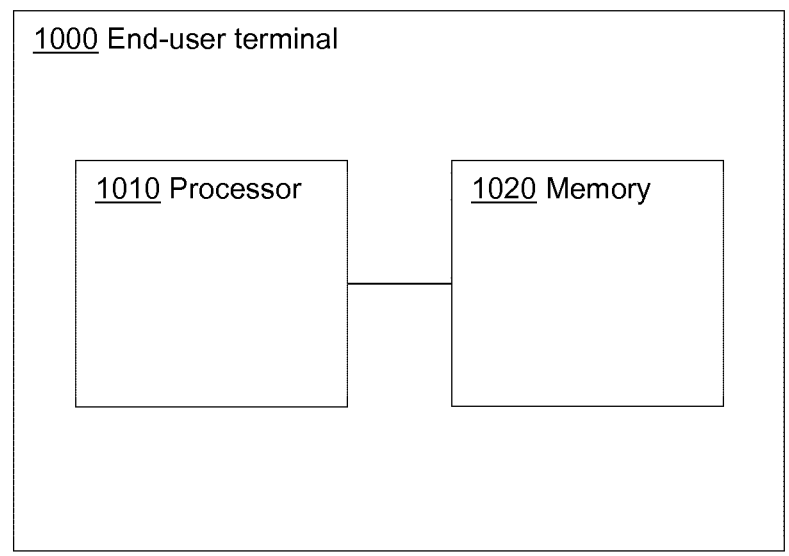
FIGS. 12 and 13 illustrate end-user terminals according to embodiments of the invention.

Referring to FIG. 12, an embodiment of the invention provides end-user terminal 1000 comprising a processor 1010 and memory 1020. The memory contains instructions executable by the processor whereby the user terminal is operative to:

receive advertisement content from an advertisement server;

receive video-on-demand, VoD, content from a content delivery network;

obtain network quality metrics between the end-user terminal and the content delivery network, CDN;

predict whether a stalling event will occur during playout of VoD content within a prediction time window based on the network quality metrics; and play out received VoD content and received advertisement content, wherein playout of advertisement content within the prediction time window is dependent on a result of the prediction.

In an embodiment, the memory contains instructions executable by the processor whereby the user terminal is operative to bring forward playout of advertisement content having a pre-set playout time that is later than a predicted stalling event within the prediction time window so that the advertisement content is played out during the stalling event.

In an embodiment, the memory contains instructions executable by the processor whereby the user terminal is operative to delay playout of advertisement content having a pre-set playout time that is earlier than a predicted stalling event within the prediction time window so that the advertisement content is played out during the predicted stalling event.

In an embodiment, the memory contains instructions executable by the processor whereby the user terminal is operative to detect a stalling event during VoD content playout. The memory additionally contains instructions executable by the processor whereby the user terminal is operative to bring forward playout of advertisement content having a pre-set playout time that is later than a detected stalling event so that the advertisement content is played out during the detected stalling event.

In an embodiment, the VoD content has a video session duration. The memory contains instructions executable by the processor whereby the user terminal is operative to divide the video session duration into a plurality of prediction time windows such that there is at most one pre-set playout time for advertisement content within each prediction time window.

In an embodiment, the memory contains instructions executable by the processor whereby the user terminal is operative to bring forward playout of advertisement content from a pre-set playout time in a current prediction time window or in the next prediction time window so that the advertisement content is played out during the stalling event within the current prediction time window.

In an embodiment, the memory contains instructions executable by the processor whereby the user terminal is operative to predict whether a stalling event will occur during playout of VoD content during a current prediction time window based on network quality metrics obtained during the preceding prediction time window.

In an embodiment, the memory contains instructions executable by the processor whereby the user terminal is operative to ignore a predicted stalling event or a detected stalling event that has a duration of less than or equal to 3 s, such that playout of advertisement content is not varied from a pre-set playout time.

Figure 13:
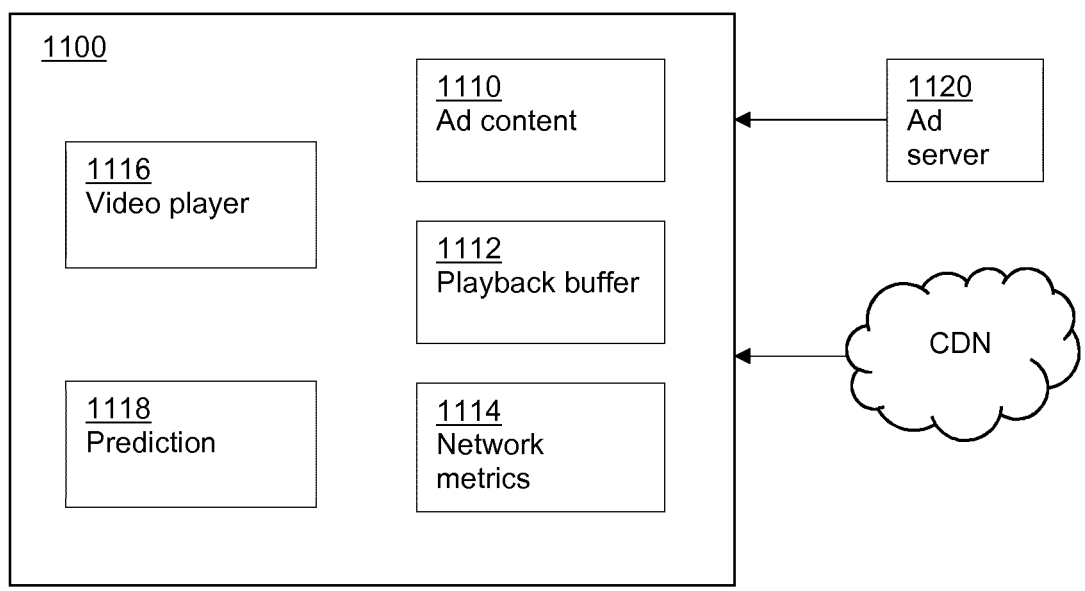

Referring to FIG. 13, an embodiment of the invention provides end-user terminal 1100 comprising an advertisement content module 1110, a playback buffer 1112, a network metrics module 1114, a prediction module 1118 and a video player module 1116.

The advertisement content module 1110 is configured to receive advertisement content from an advertisement server 1120. The playback buffer 1112 is configured to receive video-on-demand, VOD, content from a content delivery network, CDN. The network metrics module 1114 is configured to obtain network quality metrics between the end-user terminal and the content delivery network. The prediction module 1118 is configured to predict whether a stalling event will occur during playout of VoD content within a prediction time window based on the network quality metrics. The video player module 1116 is configured to playout VoD content from the playback buffer and advertisement content from the advertisement content module. The video player module 1116 is additionally configured to postpone playout of advertisement content having a pre-set playout time within the prediction time window that is earlier than a predicted stalling event within the prediction time window so that the advertisement content is played out during the predicted stalling event.

The invention claimed is:

1. A method of controlling playout of advertisement content during video-on-demand video streaming on an end-user terminal, the method comprising:
   receiving advertisement content from an advertisement server;
   receiving video-on-demand (VoD) content from a content delivery network, wherein the VoD content has a video session duration;
   dividing the video session duration into a plurality of equal length prediction time windows such that there is at most one pre-set playout time for the received advertisement content within each prediction time window;
   obtaining network quality metrics between the end-user terminal and the content delivery network;
   predicting whether a stalling event will occur during playout of VoD content within a current prediction time window based on the network quality metrics obtained during a preceding prediction time window; and
   playing out the received VoD content and the received advertisement content, wherein playout of the received advertisement content within the current prediction time window is dependent on a result of the prediction.

2. The method of claim 1, further comprising bringing forward playout of the received advertisement content having a pre-set playout time that is later than a predicted stalling event within the current prediction time window so that the received advertisement content is played out during the predicted stalling event.

3. The method of claim 1, further comprising delaying playout of the received advertisement content having a pre-set playout time that is earlier than a predicted stalling event within the current prediction time window so that the received advertisement content is played out during the predicted stalling event.

4. The method of claim 1, further comprising:
   detecting a stalling event during playout of received VoD content; and
   bringing forward playout of the received advertisement content having a pre-set playout time that is later than the detected stalling event so that the received advertisement content is played out during the detected stalling event.

5. The method of claim 1:
   wherein the received advertisement content has a pre-set playout time in the current prediction time window or in a next prediction time window that is later than a predicted stalling event in the current prediction time window;
   the method further comprising bringing forward the pre-set playout time so that the received advertisement content is played out during the predicted stalling event within the current prediction time window.

6. The method of claim 1, further comprising, if a predicted stalling event or a detected stalling event has a duration of less than or equal to 3 seconds, ignoring the stalling event and playing out the received advertisement content at a pre-set playout time for the received advertisement content.

7. An end-user terminal comprising:
   processing circuitry; and
   memory containing instructions executable by the processing circuitry whereby the end-user terminal is operative to:
   receive advertisement content from an advertisement server;
   receive video-on-demand (VoD) content from a content delivery network, wherein the VoD content has a video session duration;
   divide the video session duration into a plurality of equal length prediction time windows such that there is at most one pre-set playout time for the received advertisement content within each prediction time window;
   obtain network quality metrics between the end-user terminal and the content delivery network;
   predict whether a stalling event will occur during playout of the VoD content within a current prediction time window based on the network quality metrics obtained during a preceding prediction time window; and
   play out the received VoD content and the received advertisement content, wherein playout of the received advertisement content within the current prediction time window is dependent on a result of the prediction.

8. The end-user terminal of claim 7, wherein the instructions are such that the end-user terminal is operative to bring forward playout of the received advertisement content having a pre-set playout time that is later than a predicted stalling event within the current prediction time window so that the received advertisement content is played out during the stalling event.

9. The end-user terminal of claim 7, wherein the instructions are such that the end-user terminal is operative to delay playout of the received advertisement content having a pre-set playout time that is earlier than a predicted stalling event within the current prediction time window so that the received advertisement content is played out during the predicted stalling event.

10. The end-user terminal of claim 7, wherein the instructions are such that the end-user terminal is operative to:
detect a stalling event during VoD content playout; and
bring forward playout of the received advertisement content having a pre-set playout time that is later than a detected stalling event so that the received advertisement content is played out during the detected stalling event.

11. The end-user terminal of claim 7:
wherein the received advertisement content has a pre-set playout time in the current prediction time window or in a next prediction time window that is later than a predicted stalling event in the current prediction time window; and
wherein the instructions are such that the end-user terminal is operative to bring forward playout of the received advertisement content from the pre-set playout time so that the received advertisement content is played out during the stalling event within the current prediction time window.

12. The end-user terminal of claim 7, wherein the instructions are such that the end-user terminal is operative to ignore a predicted stalling event or a detected stalling event that has a duration of less than or equal to 3 seconds, such that playout of the received advertisement content is not varied from a pre-set playout time.

13. A non-transitory computer readable recording medium storing a computer program product for controlling playout of advertisement content during video-on-demand video streaming on an end-user terminal, the computer program product comprising program instructions which, when run on processing circuitry of the end-user terminal, causes the end-user terminal to:
receive advertisement content from an advertisement server;
receive video-on-demand (VoD) content from a content delivery network, wherein the VoD content has a video session duration;
divide the video session duration into a plurality of equal length prediction time windows such that there is at most one pre-set playout time for the received advertisement content within each prediction time window;
obtain network quality metrics between the end-user terminal and the content delivery network;
predict whether a stalling event will occur during playout of the VoD content within a current prediction time window based on the network quality metrics obtained during a preceding prediction time window; and
play out the received VoD content and the received advertisement content, wherein playout of the received advertisement content within the current prediction time window is dependent on a result of the prediction.

14. The method of claim 1 wherein the plurality of equal length prediction time windows comprises the current prediction time window and the preceding prediction time window.

* * * * *